United States Patent
Ono et al.

(10) Patent No.: US 6,605,162 B2
(45) Date of Patent: Aug. 12, 2003

(54) ANISOTROPIC MAGNET AND PROCESS OF PRODUCING THE SAME

(75) Inventors: Hideaki Ono, Kanagawa (JP); Munekatsu Shimada, Tokyo (JP); Norihisa Waki, Kanagawa (JP); Akira Fujiki, Kanagawa (JP); Takahiko Iriyama, Aichi (JP)

(73) Assignees: Nissan Motor Co., Ltd., Yokohama (JP); Daido Tokushuko Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/925,474

(22) Filed: Aug. 10, 2001

(65) Prior Publication Data

US 2002/0043302 A1 Apr. 18, 2002

(30) Foreign Application Priority Data

Aug. 11, 2000 (JP) ........................................ 2000-243637
Aug. 11, 2000 (JP) ........................................ 2000-243642

(51) Int. Cl.$^7$ ................................................ A01F 1/057
(52) U.S. Cl. ........................ 148/302; 148/101; 148/120
(58) Field of Search ................................ 148/302, 101, 148/120; 420/83, 121

(56) References Cited

U.S. PATENT DOCUMENTS

| 4,881,985 A | | 11/1989 | Brewer et al. ............... 148/103 |
| 4,960,474 A | * | 10/1990 | Nozawa et al. .............. 148/302 |
| 5,049,208 A | * | 9/1991 | Yajima et al. ............... 148/302 |
| 5,125,988 A | * | 6/1992 | Akioka et al. ............... 148/101 |
| 5,213,631 A | * | 5/1993 | Akioka et al. ............... 148/302 |
| 5,292,380 A | * | 3/1994 | Tanigawa et al. ............ 148/302 |
| 6,432,158 B1 | * | 8/2002 | Harada et al. ............... 148/108 |
| 2002/0003006 A1 | * | 1/2002 | Nishimoto et al. .......... 148/102 |

FOREIGN PATENT DOCUMENTS

EP       0 288 637      11/1988
WO       WO 92/15995     9/1992

OTHER PUBLICATIONS

I. Akihisa; Patent Abstracts of Japan; vol. 2000, No. 02, Feb. 29, 2000.
S. Haroaki; Patent Abstracts of Japan; vol. 016, No. 567 (E–1296); Dec. 8, 1992.
R. K. Mishra et al., "The Development of the Microstructure of Die–Upset Nd–Fe–B Magnets", J. Magnetism And Magnetic Materials, vol. 84, 1990, pp. 88–94, Elsevier Science Publishers B.V.
N. Yoshikawa et al., "Radially Oriented High Energy Product Nd–Fe–B Ring Magnets", IEEE Transactions On Magnets, vol. 35, No. 5, Sep. 1999, pp. 3268–3270.
R. Skomski et al., "Giant Energy Product in Nanostructured Two–phase Magnets", Physical Review B, vol. 48, No. 21, Dec. 1993, pp. 15812–15816.

* cited by examiner

*Primary Examiner*—John Sheehan
(74) *Attorney, Agent, or Firm*—Foley & Lardner

(57) ABSTRACT

This invention relates to an anisotropic magnet having excellent magnetic characteristics such as a high magnetic flux density, a process for producing the same, and a motor having the same.

26 Claims, 3 Drawing Sheets

FIG. 1A
FIG. 1B
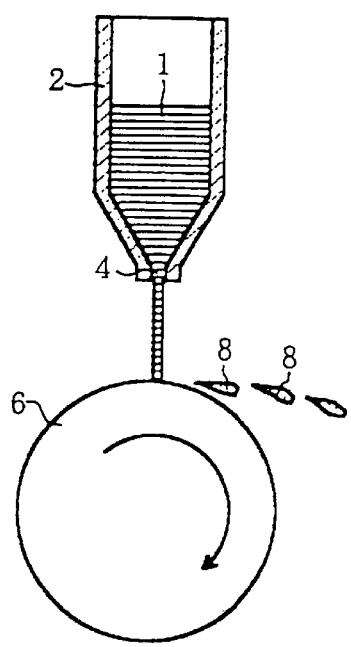
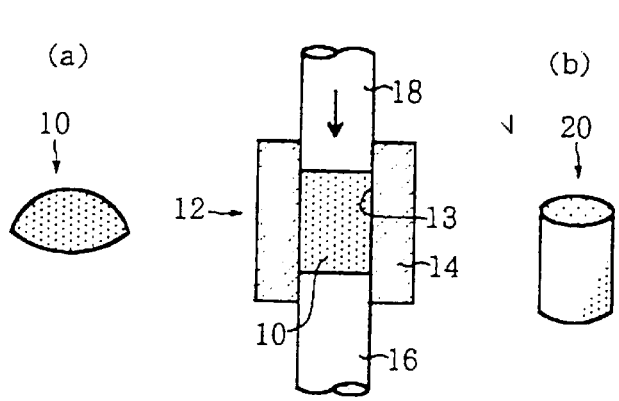
FIG. 1C
FIG. 1D
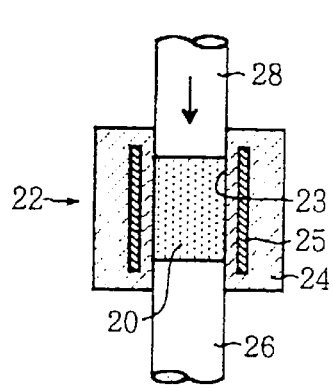
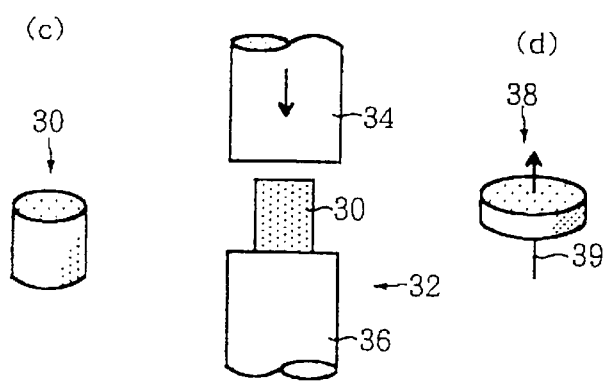
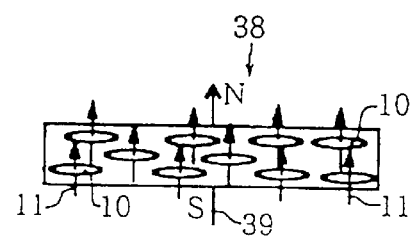
FIG. 1E

ANISOTROPIC MAGNET AND PROCESS OF PRODUCING THE SAME

FIELD OF THE INVENTION

This invention relates to a magnetically anisotropic magnet (hereinafter "anisotropic magnet") having excellent magnetic characteristics such as a high magnetic flux density, a process for producing the same, and a motor having the same. The term "magnet" is used herein to include a shaped or formed magnet precursor before magnetization.

BACKGROUND ART

Having a high energy product, rare earth magnets have been extending their market with expectation of providing motors and the like with improved performance and reduced sizes. Sintered Nd—Fe—B magnets currently available on the market have a maximum energy product of about 50 MGOe at the most. With the ever-increasing demands for motors, etc. having higher performance and yet affording energy savings, the magnet used therefor has also been required to have higher performance, especially a higher magnetic flux density.

The maximum energy product of a magnet can be obtained by calculation from the saturation magnetization of the material making the magnet. For example, the maximum energy product that could be reached theoretically by a Nd—Fe—B magnet as calculated based on the saturation magnetization of tetragonal $Nd_2Fe_{14}B$, the predominant phase thereof (=16.0 kG), is 64.0 MGOe (=$(16.0/2)^2$). The maximum energy product of available Nd—Fe—B magnets in the practice has been improved toward this theoretical value and raised to about 50 MGOe as noted above, which is seen as approaching to a substantial limit that could be reached. Hence, in order to achieve great improvements on magnetic characteristics, other approaches different from conventional manipulations have been sought.

Materials for Nd—Fe—B magnets which may achieve a maximum energy product exceeding the above practical limit are reported in *Physical Review B*, vol. 48, No. 21, pp. 15812–15816 (1993). The magnet reported is called an exchange spring magnet, in which Nd—Fe—B crystals and a soft magnetic phase having a high saturation magnetization, such as an α-Fe phase, are finely dispersed to enhance the interaction between the two phases thereby achieving both a high coercive force of the magnet and an increased magnetic flux density of the α-Fe phase.

If the Nd—Fe—B crystals have a large grain size, the above-described effect cannot be produced however. In order to draw forth the interaction between the two phases, it is generally required to use fine crystal grains as small as 1 μm or less. Preparation of fine particles by a rapid solidification process or preparation of a thin film of fine crystals by sputtering has been attempted to make an exchange spring magnet. There is a report that these approaches have succeeded in producing the interaction between the two phases, but, in either case, the crystals forming the resulting magnet are randomly oriented. That is, the resulting magnets are magnetically isotropic, having the N- and S-poles directions at random, and therefore fail to exhibit high magnetic characteristics.

The following approach is also conceivable for obtaining an anisotropic exchange spring magnet. In the production of a Nd—Fe—B magnet, a Nd—Fe—B alloy powder having a particle size of several microns is pressed in a magnetic field before sintering to prepare a magnetically orientated green body. In this process, if the Nd—Fe—B powder mixed with Fe powder is pressed in a magnetic field followed by sintering, there seems to be a possibility of making an anisotropic exchange spring magnet in which the Nd—Fe—B particles and the Fe particles exert mutual actions.

In the practice, however, this method fails to produce an anisotropic exchange spring magnet because the Nd—Fe—B particles before sintering are too large as having several microns to produce the interaction.

*Journal of Magnetism and Magnetic Materials*, vol. 84, pp. 88–94 (1990) proposes subjecting a magnetic material to hot plastic forming to obtain an anisotropic magnet. According to the report, rapid solidification-processed Nd—Fe—B-based powder whose Nd content is higher than the stoichiometric one of $Nd_2Fe_{14}B$ is compacted by hot pressing, and the resulting bulk is plastically deformed by upsetting to provide an anisotropic magnet with a raised maximum energy product $(BH)_{max}$, in which the originally isotropic magnetic material has been rendered anisotropic.

The mechanism of the change from isotropy to anisotropy is that the $Nd_2Fe_{14}B$ crystals surrounded by a Nd-rich boundary phase grow with grain boundary sliding in plastic deformation and are thereby orientated to show anisotropy. Having a low melting point around 600° C., the Nd-rich boundary phase is melted in hot plastic forming so that it seems to serve like a lubricant and also function as an accelerator for crystal growth. This technique of making a magnetic material anisotropic by hot plastic forming cannot be applied without difficulty to production of the Nd—Fe—B exchange spring magnet having a high Fe concentration because of absence of such a Nd-rich boundary phase.

It is known that the temperature in hot plastic forming is greatly influential on the degree of anisotropy obtained (see *IEEE Transactions on Magnetics*, vol. 35, No. 5, pp. 3268–3270 (1999)). According to the report, the optimum plastic forming temperature in conventional production of anisotropic magnets is about 800° C., and the degree of anisotropy achieved is reduced at either lower or higher temperatures only to provide a magnet with a reduced residual magnetization Br. Reduction in degree of anisotropy in lower or higher temperatures than the optimum one may be accounted for as follows. At lower plastic forming temperatures, crystal growth with grain boundary sliding, which is to lead to anisotropy, hardly occurs in plastic forming. On the other hand, higher temperatures allow crystal grains to grow in random directions before plastic forming is effected. As a result, the grain growth by plastic forming would not be so appreciable as could have been. That is, production of an anisotropic magnet by conventional hot plastic forming essentially requires the presence of a Nd-rich boundary phase, and the temperature of the hot plastic forming is about 800° C.

SUMMARY OF THE INVENTION

An object of the present invention is to provide an anisotropic magnet having excellent magnetic characteristics such as a high magnetic flux density, a process for producing the anisotropic magnet, and a motor having the anisotropic magnet.

The inventors of the present invention have made intensive researches into materials and production conditions for a Nd—Fe—B exchange spring magnet which is difficult to make anisotropic by known techniques on account of its high Fe concentration and absence of Nd-rich grain boundaries. As a result, they have found that the above object of the invention is accomplished by using a material having a specific composition.

Thus, the present invention provides:

(1) An anisotropic magnet which comprises a $Nd_2Fe_{14}B$ phase and an α-Fe phase and the compositional formula of Nd, Fe and B satisfies $Nd_xFe_{100-x-y}B_y$ wherein x is 2 to 10 atomic percent and y is 1 to 5 atomic percent.

(2) An anisotropic magnet as described in (1) above, wherein x is 5 to 7 atomic percent and y is 1 to 5 atomic percent.

(3) An anisotropic magnet as described in (1) or (2) above, which has 30 atomic percent or less of Fe displaced with Co.

(4) An anisotropic magnet as described in any one of (1) to (3) above, which has 1 atomic percent or less of Fe displaced with at least one element selected from Nb, V, Ti, Cr, Mo, Ta, W, Zr, and Hf.

(5) An anisotropic magnet as described in any one of (1) to (4) above, which has 50 atomic percent or less of Nd displaced with at least one rare earth element selected from Pr, Ce, Dy, and Tb.

(6) An anisotropic magnet as described in any one of (1) to (5) above, which is a molded mixture of powder comprising the $Nd_2Fe_{14}B$ phase and the α-Fe phase and a binder resin.

(7) An anisotropic magnet as described in any one of (1) to (6) above, wherein the anisotropic magnet or magnetic powder part thereof has a saturation magnetization of 15.5 kG or higher and an intrinsic coercive force of 4 to 30 kOe.

(8) The anisotropic magnet as described in (1) above, which further comprises a Nd—Cu phase and the compositional formula of Nd, Fe, B and Cu satisfies $Nd_xFe_{100-x-y-z}B_yCu_z$ wherein x is 2 to 10 atomic percent, y is 1 to 5 atomic percent, and z is 0.5 to 10 atomic percent.

(9) An anisotropic magnet as described in (8) above, wherein x is 2 to 7 atomic percent, y is 1 to 5 atomic percent, and z is 0.5 to 10 atomic percent.

(10) An anisotropic magnet as described in (8) or (9) above, which has 30 atomic percent or less of Fe displaced with Co.

(11) An anisotropic magnet as described in any one of (8) to (10) above, which has 50 atomic percent or less of Cu displaced with at least one element selected from Mg, Al, Si, P, Zn, Ge, Sb, Sn, and Ni.

(12) An anisotropic magnet as described in any one of (8) to (11) above, which has 50 atomic percent or less of Nd displaced with at least one rare earth element selected from Pr, Ce, Dy, and Tb.

(13) An anisotropic magnet as described in any one of (8) to (12) above, which is a molded mixture of powder comprising the $Nd_2Fe_{14}B$ phase, the α-Fe phase, and the Nd—Cu phase and a binder resin.

(14) An anisotropic magnet as described in any one of (8) to (13) above, which or magnetic powder of which has a saturation magnetization of 15.5 kG or higher and an intrinsic coercive force of 7 to 35 kOe.

(15) A process of producing an anisotropic magnet, which comprises a step of plastic forming a powder or a bulk of powder which comprises a $Nd_2Fe_{14}B$ phase and an α-Fe phase and the compositional formula of Nd, Fe and B satisfies $Nd_xFe_{100-x-y}B_y$ wherein x is 2 to 10 atomic percent and y is 1 to 5 atomic percent, at a temperature ranging from 900° to 1100° C.

(16) A process of producing an anisotropic magnet including the step of plastic forming powder or a bulk of powder which comprises a $Nd_2Fe_{14}B$ phase, an α-Fe phase, and a Nd—Cu phase and the compositional formula of Nd, Fe, B and Cu satisfies $Nd_xFe_{100-x-y-z}B_yCu_z$ wherein x is 2 to 10 atomic percent, y is 1 to 5 atomic percent, and z is 0.5 to 10 atomic percent, at a temperature ranging from 700° to 1100° C.

(17) A process of producing an anisotropic magnet as described in (15) or (16) above, wherein said plastic forming is upsetting or extrusion.

(18) A process of producing an anisotropic magnet as described in (15) or (16) above, wherein said plastic forming is preceded by cold pressing and hot pressing.

(19) A process of producing an anisotropic magnet as described in (15) or (16) above, wherein said plastic forming is followed by the step of grinding the resulting anisotropic magnet to powder, mixing the powder with a binder resin, and molding the mixture by injection molding or compression molding in a magnetic field.

(20) A motor which comprises the anisotropic magnet as described in any one of (1) to (14) fitted to a rotor or a stator as a permanent magnet.

BRIEF DESCRIPTION OF THE DRAWINGS

FIGS. 1A to 1D schematically illustrates a process for producing the anisotropic magnet of the present invention, wherein (a) is a magnetic particle, (b) is a green body, (c) is a densified body, and (d) is a resulting magnet.

FIG. 1E is a schematic cross-section of the magnet.

DETAILED DESCRIPTION OF THE INVENTION

Figure 2A:
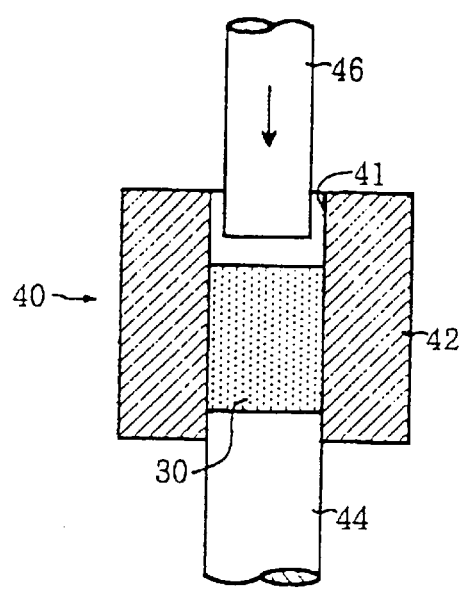
FIGS. 2A and 2B schematically shows another process for producing the anisotropic magnet of the present invention.

The present invention provides an anisotropic magnet which comprises a $Nd_2Fe_{14}B$ phase and an α-Fe phase and is represented by compositional formula: $Nd_xFe_{100-x-y}B_y$, wherein x is 2 to 10 atomic percent, and y is 1 to 5 atomic percent First Embodiment The anisotropic magnet according to this first embodiment of the present invention exhibits excellent magnetic characteristics in terms of saturation magnetization, intrinsic coercive force, magnetic flux density, and maximum energy product and, when applied to motors, etc., will make a great contribution to improvement of performance and reduction of size.

In the above compositional formula of the first embodiment of the present invention, if the Nd content is less than 2 atomic percent, and the B content is less than 1 atomic percent, the proportion of the $Nd_2Fe_{14}B$ crystal phase in the total magnetic material is too small to secure a sufficient coercive force. Where the Nd content is more than 10 atomic percent, and the B content is more than 5 atomic percent, the proportion of the $Nd_2Fe_{14}B$ crystal phase in the total magnetic material exceeds 90 atomic percent. It means that the proportion of the other phases contributory to the saturation magnetization, such as the Fe phase, is too small to provide an exchange spring magnetic.

For obtaining a high maximum energy product, it is preferred that the anisotropic magnet of the invention be represented by compositional formula: $Nd_xFe_{100-x-y}B_y$, wherein x is 5 to 7 atomic percent, and y is 1 to 5 atomic percent.

The present invention also provides an anisotropic magnet which comprises a $Nd_2Fe_{14}B$ phase, an $\alpha$-Fe phase, and a Nd—Cu phase and is represented by compositional formula: $Nd_xFe_{100-x-y-z}B_yCu_z$, wherein x is 2 to 10 atomic percent, y is 1 to 5 atomic percent, and z is 0.5 to 10 atomic percent Second Embodiment The anisotropic magnet according to the second embodiment of the present invention exhibits excellent magnetic characteristics in terms of saturation magnetization, magnetic flux density and intrinsic coercive force and, when applied to motors, etc., will make a great contribution to improvement of performance and reduction of size.

With the Nd content (x) ranging from 2 to 10 atomic percent and the B content (y) ranging from 1 to 5 atomic percent, the ratio of the $Nd_2Fe_{14}B$ crystal phase and the soft magnetic phase (Fe, $Fe_3B$, etc.) having a high saturation magnetization falls within a suitable range for a favorable interaction to exhibit a high magnetic flux density and a high coercive force. If Nd is less than 2 atomic percent, or if B is less than 1 atomic percent, the proportion of the $Nd_2Fe_{14}B$ crystal phase in the total magnetic material is too small to secure a sufficient coercive force. Where Nd is more than 10 atomic percent, and B is more than 5 atomic percent, the proportion of the $Nd_2Fe_{14}B$ crystal phase in the total magnetic material exceeds 90 atomic percent. That is, the proportion of the other phases contributory to a high saturation magnetization, such as the Fe phase, is too small to provide an exchange spring magnetic.

Addition of Cu forms a low-melting Nd—Cu phase, which seems to exert the same action as Nd-rich grain boundaries to increase the degree of anisotropy in plastic forming hereinafter described. If Cu is less than 0.5 atomic percent, this effect is insubstantial. If it exceeds 10 atomic percent, the magnetization is reduced.

For obtaining a high maximum energy product, it is preferred that the anisotropic magnet of the invention be represented by compositional formula: $Nd_xFe_{100-x-y}B_y$, wherein x is 2 to 7 atomic percent, y is 1 to 5 atomic percent, and z is 0.5 to 10 atomic percent.

The anisotropic magnet according to the invention includes sintered magnets and bonded magnets in which crystals have their axis of easy magnetization in the same direction and which are shaped articles, such as toroids (rings), disks, bars, flat rectangular plates, rods, curved rectangular plates, and the like. The term "anisotropic magnet" is intended to include not only articles having been magnetized along the axis of easy magnetization and those before magnetization.

Up to 30 atomic percent of Fe in the above compositional formula can be displaced with Co to increase the Curie point and improve high-temperature characteristics (i.e., the sum of Fe and Co satisfies the range specified above; the same applies to the similar definitions used in this specification). If the Co content exceeds 30 atomic percent, the magnetic flux density reduces, and the material cost becomes high for the quality. The magnet according to this embodiment exhibits excellent magnetic characteristics, such as a high saturation magnetization, a high magnetic flux density, and a high coercive force, and, when applied to motors, etc., will make a great contribution to performance improvement and size reduction.

Up to 1 atomic percent of Fe of the above formula can be displaced with at least one element selected from Nb, V, Ti, Cr, Mo, Ta, W, Zr, and Hf. Doping with these elements helps crystal grains be finely dispersed and be made anisotropic while suppressing growth into coarse grains in high temperature thereby to increase the magnetic flux density and the coercive force. Of the elements recited, Nb, V, Ti, Ta, Zr, and Hf are preferred for improvement on magnetic characteristics. Nb, V, and Zr are still preferred. If the content of these dopant elements exceeds 1 atomic percent, the magnetic flux density reduces.

Up to 50 atomic percent of Nd of the above formula can be displaced with at least one rare earth element selected from Pr, Ce, Dy, and Tb. The material cost can be cut by addition of Pr and/or Ce. Addition of Dy and/or Tb brings about an increase of the coercive force. Addition of more than 50 atomic percent reduces the magnetic flux density.

When Cu is contained, up to 50 atomic percent or less of Cu of the above formula can be displaced with at least one element selected from Mg, Al, Si, P, Zn, Ge, Sb, Sn, and Ni. Addition of these elements brings about a further increase in magnetic flux density and/or coercive force. Addition of more than 50 atomic percent reduces the magnetic flux density.

The anisotropic magnet of the invention includes a bonded magnet, which is a molded article of powder comprising the aforesaid two phases and a binder resin. According to this embodiment, there is provided an anisotropic magnet of any desired shape, such as a thin shape, a complicated shape, or a small shape, with good dimensional accuracy while retaining excellent magnetic characteristics.

It is preferred for the anisotropic magnet of the invention per se or the magnetic powder thereof to have a saturation magnetization of 15.5 kG or higher and an intrinsic coercive force of 4 to 30 kOe (in the first embodiment) or 7 to 35 kOe (in the second embodiment). With the size being equal, the magnet having these magnetic characteristics enjoys superiority to a conventional one. With magnetic characteristics being equal, the magnet having these magnetic characteristics is smaller in size than a conventional one. This promises benefits to motors, etc. in performance improvement and size reduction.

The anisotropic magnet according to the present invention is preferably produced by a process including the step of plastic forming powder or a bulk of powder which comprises a $Nd_2Fe_{14}B$ phase and an $\alpha$-Fe phase and is represented by compositional formula: $Nd_xFe_{100-x-y}B_y$, wherein x is 2 to 10 atomic percent, and y is 1 to 5 atomic percent, at a temperature ranging from 900° to 1100° C. By carrying out plastic forming at a higher temperature than in conventional techniques, the degree of anisotropy is raised, and the coercive force is increased. In temperatures lower than 900° C., the degree of anisotropy reached reduces. If the temperature is higher than 1100° C., both the degree of anisotropy and the coercive force will reduce. When Cu is contained, the temperature range of from 800 to 1000° C., particularly 850 to 950° C., is preferred for obtaining an increased maximum energy product. The term "bulk" means an aggregate of powder.

The plastic forming is preferably carried out by upsetting or extrusion to secure anisotropy of the resulting formed body or magnet.

In a preferred embodiment of the process, the plastic forming is preceded by cold pressing and hot pressing. In this embodiment, the powder is pressed into a green body, which is then hot pressed into a high-density body. The resulting high-density body is subjected to the above-described plastic forming to produce a magnet of the shape and dimension as designed with high accuracy in which the crystal grains are oriented securely to show a higher degree of anisotropy.

In another preferred embodiment of the process, the plastic forming can be followed by the step of grinding the resulting anisotropic magnet to powder, mixing the powder with a binder resin, and molding the mixture by injection molding or compression molding in a magnetic field. In this embodiment, an anisotropic magnet having an arbitrary shape with excellent magnetic characteristics can be obtained with ease. The injection molded magnet thus obtained may be once demagnetized and then re-magnetized along the axis of easy magnetization to provide an anisotropic bonded magnet with higher magnetic characteristics.

The present invention also provides a motor having the above-described anisotropic magnet fitted to a rotor or a stator as a permanent magnet. The motor according to the invention in which a combination of the magnet and a coil is used as a rotor or a stator generates a high torque with a smaller size and less electric power than conventional motors and is therefore useful as a drive motor in diverse applications, such as electric cars, hybrid electric cars, magnetic field sensors, rotation sensors, acceleration sensors, torque sensors, office automation equipment, audio/visual equipment, various digital equipment, portable laptop computers, portable terminals, and so forth. The shape of the magnet used in the motor includes a ring, a curved rectangular plate, and a flat plate.

The present invention will be further illustrated in greater detail with particular reference to its preferred embodiments by way of the accompanying drawings and Examples. The present invention should not be construed as being limited thereto.

As shown in FIG. 1A, a Nd—Fe—B—Co alloy 1 (first embodiment) or a Nd—Fe—Cu—B alloy 1 (second embodiment) is put into a nozzle 2 made of quartz and melted by induction heating in an argon atmosphere. The molten alloy 1 is spouted through an orifice 4 having an inner diameter of 0.5 mm which is at the lower end of the nozzle 2 in a thin stream onto a copper-made roll 6 rotating at a peripheral speed of 25 m/sec. On contact with the rotating roll 6, the molten alloy is rapidly solidified and flown in the form of a very thin ribbon 8. The ribbons 8 have the composition of $Nd_8Fe_{83}Co_5B_4$ (first embodiment) or $Nd_7Fe_{82}Co_5Cu_3B_3$ (second embodiment). The ribbons 8 are ground in a grinding machine (not shown) and sieved to prepare powder 10 having a particle size of 300 µm or smaller (a particle 10 is shown in FIG. 1A (a)).

As shown in FIG. 1B, the powder 10 is packed into the cavity 13 of a cylindrical die 14 of a cold press 12 and compressed at room temperature between a cylindrical bottom plug 16 that has previously been inserted into the cavity 13 and a force plug 18 that is inserted after the packing to obtain a cylindrical green body 20 having an outer diameter of 20 mm and a height of 50 mm (shown in FIG. B (b)).

As shown in FIG. 1C, the green body 20 is put into the cavity 23 of a dye 24 of a hot press 22. The dye 24 has a heater 25 in the inside thereof. The green body 20 is hot pressed at 800° C. in an argon atmosphere between a cylindrical bottom plug 26 that has previously been inserted into the cavity 23 and a force plug 28 that is inserted afterwards to obtain a cylindrical densified body 30 having an outer diameter of 20 mm and a height of 30 mm (shown in FIG. 1C (c)).

As shown in FIG. 1D, the densified body 30 is set in an upset apparatus 32 between an upper plug 34 and a lower plug 36, and the upper and the lower plugs 34 and 36 are brought closer while heating at 1000° C. (first embodiment) or 850° C. (second embodiment) in an argon atmosphere to an axial reduction ratio of 85%. As a result, a disk magnet (magnet precursor) 38 having an outer diameter of 52 mm and a height (thickness) of 4.5 mm as shown in FIG. 1D (d). Having the particles 10 aligned flat, the magnet 38 exhibits magnetic anisotropy with its easy magnetization axis 39 in the thickness direction. With the individual particles 10 being oriented to have their easy magnetization axis in the thickness direction of the magnet 38 as illustrated in FIG. 1E, the magnet 38 forms an N-pole and an S-pole on the easy magnetization axis 39, i.e., on each side of the disk upon being magnetized in a usual manner, thereby to possess an intense magnetic force.

Figure 2B:
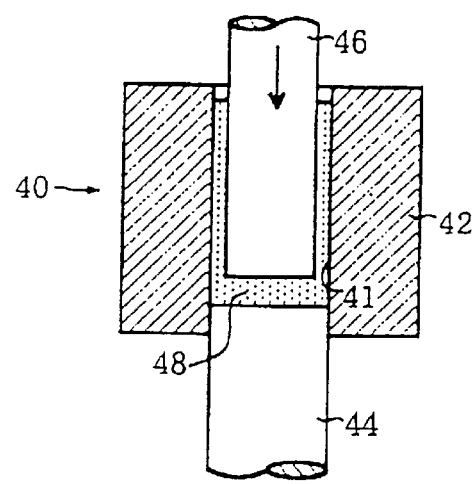
Figure 2C:
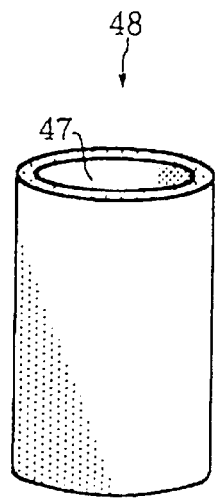
FIG. 2C is a perspective of the resulting formed body.

In place of the upsetting, plastic forming can be carried out by extrusion as shown in FIGS. 2A and 2B. The densified body 30 is put into the cylindrical cavity 41 of a die 42 of an extruder 40, in which a bottom plug has previously been inserted. A force plug 46 having a smaller diameter than the cavity 41 is inserted to extrude the body 30 backward at 800° C. in an argon atmosphere to obtain a magnet (magnet precursor) 48, which is an open top hollow cylinder (see FIG. 2C) and which has magnetic anisotropy in the radial direction.

Figure 2D:
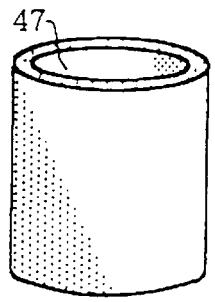
FIGS. 2D and 2E are a perspective and a schematic cross-section, respectively, of a magnet cut out of the formed body.
Figure 2E:
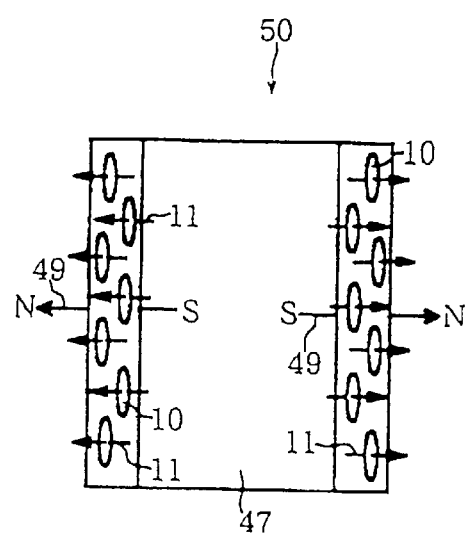

The closed end of the magnet 48 is cut off, and the cylinder is magnetized in a known manner to give a magnet 50 of FIG. 2D. As shown in FIG. 2E, flat particles 10 are oriented in parallel to the axis of the magnet 50 to have their easy magnetization axis aligned in the radial direction so that the easy magnetization axis of the magnet 50 as a whole is also in the radial direction.

EXAMPLE 1

A magnet 38 (first embodiment) was prepared from the same material by the same process adopting the step of upsetting (1000° C.) as described above. In order to determine magnetic characteristics, the magnet 38 was cut into a 4.5 mm-side cubic test piece. The magnetic characteristics of the test piece in the direction along the easy magnetization axis 39 and in the direction perpendicular to that direction (hereinafter "crossing direction") were measured with a BH tracer. The results obtained are shown in Table 1 below. In the Table, "saturation magnetization" is a magnetization measured when an external magnetic field of 20 kOe is applied (hereinafter the same).

TABLE 1

|  | Easy Magnetization Axis Direction | Crossing Direction |
| --- | --- | --- |
| Saturation Magnetization ($4\pi Is$) | 16.5 kG | 6.9 kG |
| Residual Magnetization (Br) | 15.5 kG | 3.5 kG |

TABLE 1-continued

|  | Easy Magnetization Axis Direction | Crossing Direction |
|---|---|---|
| Intrinsic Coercive Force (iHc) | 15.7 kOe | 4.6 kOe |
| Maximum Energy Product ((BH)$_{max}$) | 52 MGOe | 1.3 MGOe |

As is seen from the results in Table 1, all the magnetic attributes are higher in the direction of the easy magnetization axis 39 than in the crossing direction. In particular, the maximum energy product is remarkably higher in the easy magnetization direction than in the crossing direction, reaching the level of 50 MGOe that has been difficult to attain with conventional anisotropic magnets. As a result of X-ray structural analysis, the test piece of Example 1 was found to be a mixture of $Nd_2Fe_{14}B$ crystals and α-Fe crystals. Further, the test piece had a saturation magnetization more than 15.5 kG and an intrinsic coercive force more than 4 kOe. These results verify that the anisotropic magnet 38 possesses excellent magnetic characteristics.

EXAMPLE 2

A densified body 30 (first embodiment) was prepared with the same size and in the same manner as described above and subjected to backward extrusion by use of the extruder 40 shown in FIG. 2A at 1000° C. in an argon atmosphere. The closed end of the extruded cylinder was cut off. Magnetization gave a cylindrical magnet 50 having an outer diameter of 20 mm, an inner diameter of 16 mm and a height of 60 mm, which was magnetically anisotropic along its radial direction.

The magnet 50 was cut into a curved rectangular plate 4 mm wide, 10 mm long and 7 mm thick. The magnetic characteristics of the resulting test piece were measured in the direction of easy magnetization axis 39 with a BH tracer. The results obtained are shown in Table 2 below.

TABLE 2

|  | Easy Magnetization Axis Direction |
|---|---|
| Saturation Magnetization (4πIs) | 16.2 kG |
| Residual Magnetization (Br) | 15.1 kG |
| Intrinsic Coercive Force (iHc) | 16.9 kOe |
| Maximum Energy Product ((BH)$_{max}$) | 48 MGOe |

It is seen that the maximum energy product of the magnet 50 is 49 MGOe, which is on the same level as has been achieved by conventional radially anisotropic magnets. The saturation magnetization exceeds 15.5 kG, and the intrinsic coercive force exceeds 4 kOe.

EXAMPLE 3

And Comparative Example 1

A magnet 38 was prepared in the same manner as in Example 1. The magnet 38 was ground in a pin mill and sieved to obtain magnetic powder having a particle size between 50 μm and 300 μm. The magnetic powder was blended with 6 wt % of a polyamide resin as a binder, kneaded in a twin-screw extruder at 230° C., extruded, and pelletized to obtain about 4 mm pellets. The pellets were injection molded at 260° C. while applying a magnetic field of 13 kOe to obtain a cylindrical anisotropic magnet.

For comparison, an anisotropic magnet was prepared in the same manner as described above, except that the upsetting was carried out at 800° C.

Each of the resulting bonded magnets was demagnetized, cut to size, and re-magnetized to obtain a 7 mm-side cubic magnet. The magnetic characteristics of the cubic magnets in the direction of the easy magnetization axis were measured with a BH loop tracer. The results obtained are shown in Table 3.

TABLE 3

|  | Example 3 | Compara. Example 1 |
|---|---|---|
| Residual Magnetization (Br) | 9.7 kG | 6.75 kG |
| Intrinsic Coercive Force (iHc) | 14.6 kOe | 16.5 kOe |
| Maximum Energy Product ((BH)$_{max}$) | 19.8 MGOe | 6.8 MGOe |

As shown in Table 3, the maximum energy product of the magnet of Example 3 is about 20 MGOe, which is about three times that of the magnet of Comparative Example 1, proving the bonded magnet of Example 3 excellent in magnetic characteristics.

EXAMPLE 4

And Comparative Example 2

The same magnetic powder as prepared in Example 3 was mixed with 2 wt % of an epoxy resin as a binder resin, and the mixture was compression molded in a press under a pressure of 980 MPa while applying a magnetic field of 15 kOe to obtain a cylindrical anisotropic bonded magnet. The resulting bonded magnet was demagnetized, heat-treated at 150° C. for 1 hour in a nitrogen atmosphere to cure the epoxy resin, and re-magnetized to obtain a cylindrical anisotropic bonded magnet having an outer diameter of 10 mm and a height of 7 mm.

For comparison, an anisotropic bonded magnet was prepared in the same manner as described above, except that the upsetting was carried out at 800° C.

The magnetic characteristics of the resulting magnets in the direction of their easy magnetization axis were measured with a BH loop tracer. The results obtained are shown in Table 4.

TABLE 4

|  | Example 4 | Compara. Example 2 |
|---|---|---|
| Residual Magnetization (Br) | 12.5 kG | 8.9 kG |
| Intrinsic Coercive Force (iHc) | 15.6 kOe | 16.7 kOe |
| Maximum Energy Product ((BH)$_{max}$) | 33.6 MGOe | 10.8 MGOe |

As shown in Table 4, the maximum energy product of the magnet of Example 4 is about 34 MGOe, which is about three times that of the magnet of Comparative Example 2, verifying that the anisotropic bonded magnet of Example 4 possesses excellent magnetic characteristics.

EXAMPLES 5 TO 37

And Comparative Example 3

Thin ribbons 8 were prepared from a Nd—Fe—B alloy powder whose compositional formula is shown in Table 5 by a rapid solidification process using the nozzle 2 and the roll 6 of FIG. 1A. The ribbons 8 were ground and sieved to obtain magnetic powder 10 having an average particle size of 300 μm or smaller.

As shown in FIGS. 1B and 1C, the powder 10 was pressed at ambient temperature to obtain a green body 20 having an outer diameter of 20 mm and a height of 50 mm. The green body 20 was hot pressed at 800° C. in an argon atmosphere to obtain a densified body 30 having an outer diameter of 20 mm and a height of 30 mm. The densified body 30 was placed between the upper plug 34 and the lower plug 36 of the upset apparatus 32 shown in FIG. 1D, and the upper and the lower plugs 34 and 36 were brought closer while heating at the temperature shown in Table 5 (900 to 1100° C.) in an argon atmosphere to an axial reduction ratio of 85% to obtain disk magnets (magnet precursors) having an outer diameter of 52 mm and a thickness of 4.5 mm as shown in FIG. 1D (d).

Since every particle 10 making up the magnetic precursor, being aligned flat, had its easy magnetization axis 11 in the thickness direction, the magnet precursor became an anisotropic magnet 38 upon being magnetized as shown in FIG. 1E.

A 4.5 mm-side cubic test piece was cut out of the magnet 38, and the magnetic characteristics in the direction along the easy magnetization axis 39 were measured with a BH tracer. The results obtained are shown in Table 5.

TABLE 5

| Example No. | Alloy Composition (at. %) | Upsetting Temp. (° C.) | Sat. Magn. (kG) | Res. Magn. (kG) | Int. Coercive Force (kOe) | Max. Energy Product (MGOe) |
|---|---|---|---|---|---|---|
| 5 | $Nd_2Fe_{97}B_1$ | 1000 | 20.3 | 19.1 | 4.3 | 30.2 |
| 6 | $Nd_2Fe_{95}B_3$ | 1000 | 19.2 | 18.5 | 5.8 | 39.4 |
| 7 | $Nd_2Fe_{93}B_5$ | 1000 | 18.8 | 18.0 | 7.2 | 41.5 |
| 8 | $Nd_5Fe_{94}B_1$ | 1000 | 18.9 | 18.0 | 9.2 | 52.3 |
| 9 | $Nd_5Fe_{92}B_3$ | 1000 | 18.5 | 18.2 | 11.6 | 54.5 |
| 10 | $Nd_5Fe_{90}B_5$ | 1000 | 17.9 | 17.3 | 13.9 | 58.3 |
| 11 | $Nd_7Fe_{92}B_1$ | 1000 | 17.5 | 16.1 | 13.7 | 49.8 |
| 12 | $Nd_7Fe_{90}B_3$ | 1000 | 17.2 | 16.6 | 15.4 | 63.7 |
| 13 | $Nd_7Fe_{88}B_5$ | 1000 | 16.9 | 16.3 | 16.1 | 59.6 |
| 14 | $Nd_{10}Fe_{89}B_1$ | 1000 | 16.1 | 15.5 | 16.7 | 45.2 |
| 15 | $Nd_{10}Fe_{87}B_3$ | 1000 | 15.7 | 15.1 | 17.8 | 43.4 |
| 16 | $Nd_{10}Fe_{85}B_5$ | 1000 | 15.5 | 14.7 | 18.4 | 40.6 |
| 17 | $Nd_7Fe_{90}B_3$ | 900 | 16.8 | 16.0 | 16.0 | 59.9 |
| 18 | $Nd_7Fe_{90}B_3$ | 1100 | 17.6 | 16.9 | 14.0 | 65.5 |
| 19 | $Nd_7Fe_{85}Co_5B_3$ | 1000 | 17.5 | 16.7 | 15.5 | 66.7 |
| 20 | $Nd_7Fe_{73}Co_{17}B_3$ | 1000 | 17.9 | 17.0 | 15.9 | 70.0 |
| 21 | $Nd_7Fe_{63}Co_{27}B_3$ | 1000 | 17.7 | 17.1 | 16.0 | 70.3 |
| 22 | $Nd_{3.5}Pr_{3.5}Fe_{90}B_3$ | 1000 | 17.5 | 16.9 | 14.9 | 69.0 |
| 23 | $Nd_6Ce_1Fe_{90}B_3$ | 1000 | 17.2 | 16.8 | 14.8 | 64.5 |
| 24 | $Nd_5Dy_2Fe_{90}B_3$ | 1000 | 16.1 | 15.6 | 30.1 | 52.2 |
| 25 | $Nd_6Tb_1Fe_{90}B_3$ | 1000 | 16.5 | 15.9 | 22.0 | 55.3 |
| 26 | $Nd_5Dy_1Ce_1Fe_{90}B_3$ | 1000 | 16.9 | 16.5 | 23.8 | 62.6 |
| 27 | $Nd_7Fe_{89.7}Nb_{0.3}B_3$ | 1000 | 17.0 | 16.8 | 15.5 | 63.8 |
| 28 | $Nd_7Fe_{89.4}Nb_{0.6}B_3$ | 1000 | 16.8 | 16.6 | 15.9 | 63.9 |
| 29 | $Nd_7Fe_{89.9}Nb_{0.9}B_3$ | 1000 | 16.2 | 15.8 | 17.1 | 55.5 |
| 30 | $Nd_7Fe_{89.4}V_{0.6}B_3$ | 1000 | 16.7 | 16.1 | 15.7 | 59.0 |
| 31 | $Nd_7Fe_{89.4}Ti_{0.6}B_3$ | 1000 | 16.5 | 15.9 | 16.8 | 56.0 |
| 32 | $Nd_7Fe_{89.4}Cr_{0.6}B_3$ | 1000 | 16.4 | 15.5 | 15.5 | 50.6 |
| 33 | $Nd_7Fe_{89.4}Mo_{0.6}B_3$ | 1000 | 16.8 | 15.9 | 15.2 | 51.5 |
| 34 | $Nd_7Fe_{89.4}Ta_{0.6}B_3$ | 1000 | 16.1 | 15.6 | 17.1 | 53.2 |
| 35 | $Nd_7Fe_{89.4}W_{0.6}B_3$ | 1000 | 16.0 | 15.2 | 18.0 | 50.9 |
| 36 | $Nd_7Fe_{89.4}Zr_{0.6}B_3$ | 1000 | 16.5 | 16.1 | 16.7 | 59.3 |
| 37 | $Nd_7Fe_{89.4}Hf_{0.6}B_3$ | 1000 | 16.4 | 15.9 | 16.4 | 56.6 |
| Comp. Ex. 3 | $Nd_7Fe_{90}B_3$ | 800 | 14.9 | 11.2 | 17.2 | 18.9 |

As is shown in Table 5, the magnets of Examples 5 to 37 have a maximum energy product of from about 30 to 70 MGOe, which is about three or more times that of ordinary isotropic bonded magnets (about 7 to 12 MGOe). In particular, the maximum energy product of the magnets of Examples 8 to 10, 12, 13, and 17 exceeds 50 MGOe, which is higher than those of conventional anisotropic magnets. It is thus recognized that the Nd—Fe—B alloy compositions having a Nd content (x) of 5 to 7 atomic percent and a B content (y) of 1 to 5 atomic percent are particularly desirable. The magnets of Examples 5 to 37 have a saturation magnetization of more than 15.5 kG and an intrinsic coercive force of more than 4 kOe.

Example 18 in which the plastic forming was carried out at 1100° C. achieved a maximum energy product of about 65 MGOe. A comparison between Examples 17 and 18 having the same composition reveals that the plastic forming temperature is preferably higher than 900° C. In Comparative Example 3 having the same composition as Examples 17 and 18, wherein the plastic forming temperature is 800° C., the maximum energy product is less than 20 MGOe, and the saturation magnetization and the residual magnetization are low.

In Examples 20 and 21 having a relatively high Co content, the maximum energy product exceeds 70 MGOe, and the intrinsic coercive force is high (about 16 kOe).

Examples 22 to 26 containing a rare earth element (e.g., Pr) in addition to Nd also have a high maximum energy product (about 52 to 69 MGOe) and a high intrinsic coercive force (about 15 to 30 kOe). Examples 27 to 37 containing one of Nb, V, Ti, Cr, Mo, Ta, W, Zr, and Hf also have a high maximum energy product (abut 50 to 64 MGOe) and a high intrinsic coercive force (about 15 to 18 kOe).

It is easily understood that the actions and effects of the anisotropic magnet and the process of producing the anisotropic magnet according to the present invention are supported by Examples 1 to 37.

Figure 3:
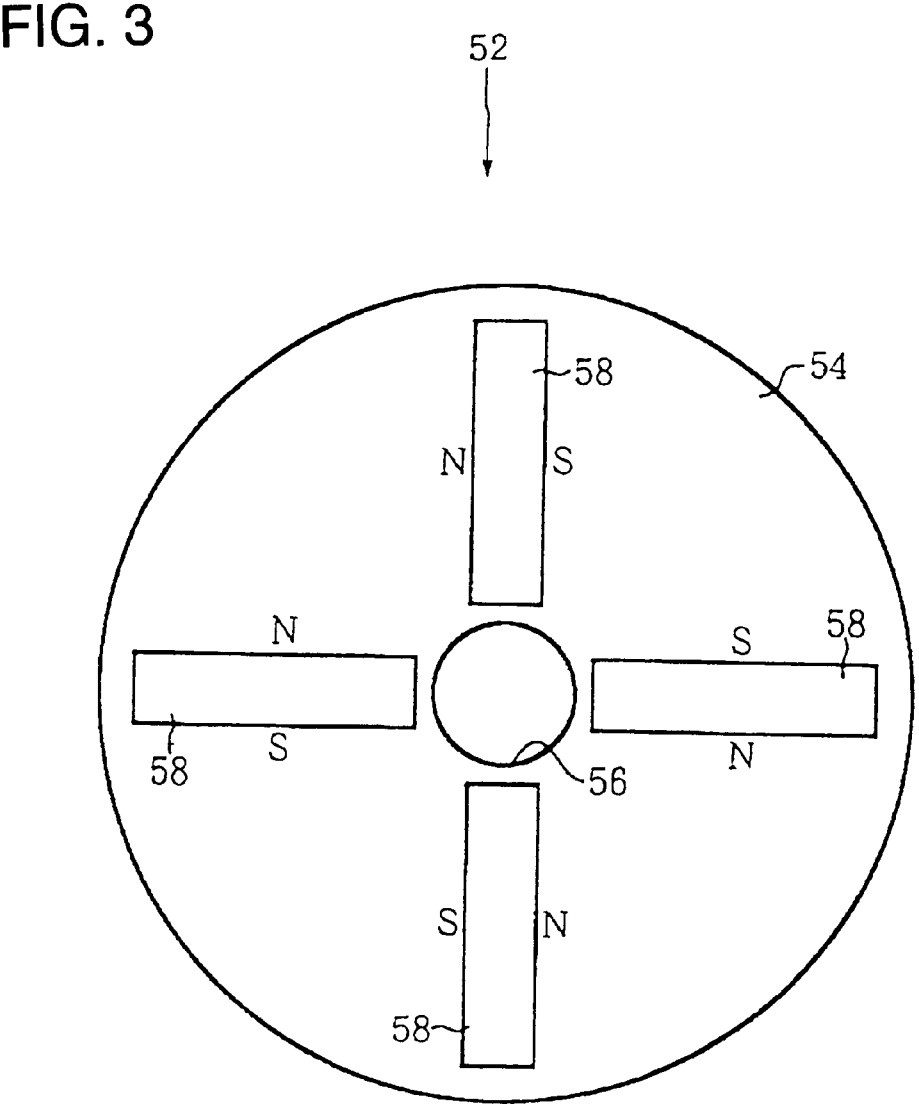
FIG. 3 is a schematic view showing a rotor for a motor.

FIG. 3 shows a rotor 52 of a motor, which has plate-shaped anisotropic magnets 58. The magnets 58 are produced by cold pressing and hot pressing ribbons 8 prepared by rapid solidification of a molten alloy having the same composition as used in Example 1 and upsetting the formed body at 1000° C. into a plate. Having the axis of easy magnetization in the thickness direction, the magnet 58 is magnetized to have an N-pole on one side thereof and an S-pole on the other as shown in FIG. 3.

The rotor 52 comprises a disk 54 having a through-hole 56 at the center, through which a rotating shaft is inserted, and four magnets 58 fixed thereto in the radial direction with one end of each magnet 58 centered at the hole 56 making right angles with one another.

The rotor 52 is assembled with a stator (not shown) having an electromagnet (not shown) into a motor. The motor produces a maximum torque increased by about 20 to 30% over a motor having the same number of conventional magnets of the same size. Application of the motor having the rotor 52 to an electric car or a hybrid electric car will provide excellent electrical characteristics or an improved fuel efficiency.

It would be easily recognized that a motor comprising a stator having a plurality of anisotropic magnets 58 shaped into a curved rectangular plate disposed on the inner surface thereof and a rotor having an electromagnet disposed in the center thereof exhibits the same performance as described above.

It should be understood that the present invention is not limited to the above-described embodiments and Examples, and various modifications can be made therein. For example, while the foregoing Examples shows only one combination of rare earth elements that can be added to the Nd—Fe—B alloy system (Example 26), other combinations of Pr, Ce, Dy, and Tb can be used as well. The metal elements Nb, V, Ti, Cr, Mo, Ta, W, Zr and Hf can be added to the Nd—Fe—B alloy system not only individually as in Examples 27 to 37 but as a combination of two or more thereof. Any alloy compositions other than those specified in the foregoing Examples produce the same effects as demonstrated above provided that they are within the scope of the present invention.

The anisotropic magnet according to the present invention is applicable as a permanent magnet for linear motors, an adsorbent magnet for artificial teeth, a permanent magnet for nuclear magnetic resonance apparatus, and the like as well as a permanent magnet for electric car motors.

The present invention provides an anisotropic magnet having excellent magnetic characteristics such as saturation magnetization, intrinsic coercive force, magnetic flux density and maximum energy product, making a great contribution to performance improvement and size reduction of motors, etc. to which it is applied. The present invention also provides a process of producing such an excellent anisotropic magnet through relatively easy steps. The present invention also provides a motor in which the excellent anisotropic magnet combined with a coil is used as a rotor or a stator and which produces a high torque with a smaller size and less electric power than conventional motors to markedly improve the performance of electric cars, and the like.

EXAMPLE 38

A magnet 38 (second embodiment) was prepared from the same material by the same process adopting the step of upsetting (850° C.) as described above. In order to determine magnetic characteristics, the magnet 38 was cut into a 4.5 mm-side cubic test piece. The magnetic characteristics of the test piece were measured with a BH tracer in the direction along the easy magnetization axis 39 and in the direction perpendicular to that direction (crossing direction). The results obtained are shown in Table 6 below. In the Table, "saturation magnetization" is a magnetization when an external magnetic field of 20 kOe is applied (hereinafter the same).

TABLE 6

|  | Easy Magnetization Axis Direction | Crossing Direction |
| --- | --- | --- |
| Saturation Magnetization ($4\pi Is$) | 16.8 kG | 5.8 kG |
| Residual Magnetization (Br) | 15.9 kG | 3.3 kG |
| Intrinsic Coercive Force (iHc) | 19.3 kOe | 6.9 kOe |
| Maximum Energy Product $((BH)_{max})$ | 58.9 MGOe | 1.2 MGOe |

All the magnetic characteristics measured are higher in the direction of the easy magnetization axis 39 than in the crossing direction. In particular the maximum energy product in the easy magnetization axis is as high as about 59 MGOe, which is inconceivably higher than in the crossing direction, approaching the level of 60 MGOe that has been difficult to achieve by conventional anisotropic magnets. In addition, the saturation magnetization exceeds 15.5 kG, and the intrinsic coercive force exceeded 7 kOe. It was confirmed by X-ray structural analysis that the test piece was a mixture of $Nd_2Fe_{14}B$ crystals, an α-Fe phase, and a Nd—Cu phase. These results prove that the anisotropic magnet 38 possesses excellent magnetic characteristics.

EXAMPLE 39

A densified body 30 (second embodiment) was prepared with the same size and in the same manner as described above and subjected to backward extrusion by use of the extruder 40 shown in FIG. 2A at 850° C. in an argon atmosphere. The closed end of the extruded cylinder was cut off to make a cylinder having an outer diameter of 20 mm, an inner diameter of 16 mm and a height of 60 mm. Magnetization gave a cylindrical magnet 50 which was anisotropic in its radial direction.

The magnet 50 was cut into a curved rectangular plate 4 mm wide, 10 mm long and 7 mm thick. The magnetic characteristics of the resulting piece were measured in the direction of easy magnetization axis 39 with a BH tracer. The results obtained are shown in Table 7 below.

TABLE 7

|  | Easy Magnetization Axis Direction |
| --- | --- |
| Saturation Magnetization (4πIs) | 16.5 kG |
| Residual Magnetization (Br) | 15.6 kG |
| Intrinsic Coercive Force (iHc) | 20.2 kOe |
| Maximum Energy Product ((BH)$_{max}$) | 52.9 MGOe |

The maximum energy product of the magnet 50 is about 53 MGOe, which is on the highest level that has been reached by conventional radially anisotropic magnets. The saturation magnetization exceeds 15.5 kG, and the intrinsic coercive force exceeds 7 kOe. X-Ray structural analysis revealed that the test piece was a mixture of $Nd_2Fe_{14}B$ crystals, an α-Fe phase, and a Nd—Cu phase. These results prove that the anisotropic magnet 50 possesses excellent magnetic characteristics.

EXAMPLE 40

And Comparative Example 4

A magnet 38 prepared in the same manner as in Example 38 was ground in a pin mill and sieved to obtain magnetic powder having a particle size between 50 μm and 300 μm. The magnetic powder was blended with 6 wt % of a polyamide resin as a binder, kneaded in a twin-screw extruder at 230° C., extruded, and pelletized to obtain about 4 mm pellets. The pellets were injection molded at 260° C. while applying a magnetic field of 13 kOe to obtain a cylindrical anisotropic bonded magnet.

For comparison, an anisotropic bonded magnet was prepared in the same manner as described above, except that the upsetting was carried out at 600° C.

Each of the resulting bonded magnets was demagnetized, cut to size, and re-magnetized to obtain a 7 mm-side cubic magnet. The magnetic characteristics of the cubic magnets in the direction of the easy magnetization axis were measured with a BH loop tracer. The results obtained are shown in Table 8.

TABLE 8

|  | Example 40 | Compara. Example 4 |
| --- | --- | --- |
| Residual Magnetization (Br) | 9.9 kG | 5.52 kG |
| Intrinsic Coercive Force (iHc) | 18.5 kOe | 24.2 kOe |
| Maximum Energy Product ((BH)$_{max}$) | 20.1 MGOe | 5.6 MGOe |

The maximum energy product of the magnet of Example 40 is about 20 MGOe, which is about three to four times that of the magnet of Comparative Example 4, proving that the bonded magnet of Example 40 possesses excellent magnetic characteristics.

EXAMPLE 41

And Comparative Example 5

The same magnetic powder as prepared in Example 40 was mixed with 2 wt % of an epoxy resin as a binder resin, and the mixture was compression molded in a press under a pressure of 980 MPa while applying a magnetic field of 15 kOe to obtain a cylindrical anisotropic bonded magnet. The resulting bonded magnet was demagnetized, heat-treated at 150° C. for 1 hour in a nitrogen atmosphere to cure the epoxy resin, and re-magnetized to obtain a cylindrical anisotropic bonded magnet having an outer diameter of 10 mm and a height of 7 mm.

For comparison, an anisotropic bonded magnet was prepared in the same manner as described above, except that the upsetting was carried out at 600° C.

The magnetic characteristics of the resulting magnets in the direction of the easy magnetization axis were measured with a BH loop tracer. The results obtained are shown in Table 9.

TABLE 9

|  | Example 41 | Compara. Example 5 |
| --- | --- | --- |
| Residual Magnetization (Br) | 12.9 kG | 7.31 kG |
| Intrinsic Coercive Force (iHc) | 19.9 kOe | 24.6 kOe |
| Maximum Energy Product ((BH)$_{max}$) | 36.3 MGOe | 9.9 MGOe |

The maximum energy product of the magnet of Example 41 is about 36 MGOe, which is about four times that of the magnet of Comparative Example 5. This owes to the high anisotropy imparted by the high-pressure compression molding. The anisotropic bonded magnet of Example 41 possesses excellent magnetic characteristics.

EXAMPLES 42 TO 76

And Comparative Example 6

Thin ribbons 8 were prepared by rapid solidification from a Nd—Fe—Cu—B alloy powder shown in Table 10 below by use of the nozzle 2 and the roll 6 of FIG. 1A. The ribbons 8 were ground and sieved to obtain magnetic powder 10 having an average particle size of 300 μm or smaller.

As shown in FIGS. 1B and 1C, the powder 10 was pressed at ambient temperature to obtain a green body 20 having an outer diameter of 20 mm and a height of 50 mm. The green body 20 was hot pressed at 800° C. in an argon atmosphere to obtain a densified body having an outer diameter of 20 mm and a height of 30 mm. The densified body 30 was placed between the upper plug 34 and the lower plug 36 of the upset apparatus 32 shown in FIG. 1D, and the upper and the lower plugs 34 and 36 were brought closer while heating at the temperature shown in Table 10 (700 to 1100° C.) in an argon atmosphere to an axial reduction ratio of 85% to obtain disk magnets (magnet precursors) 38 having an outer diameter of 52 mm and a thickness of 4.5 mm as shown in FIG. 1D (d).

Since every particle 10 making up the magnetic precursor, being aligned flat, had its easy magnetization axis 11 in the thickness direction, the magnet precursor became an anisotropic magnet 38 upon being magnetized as shown in FIG. 1E.

A 4.5 mm-side cubic test piece was cut out of the magnet 38, and the magnetic characteristics in the direction along the easy magnetization axis 39 were measured with a BH tracer. The results obtained are shown in Table 10.

TABLE 5

| Example No. | Alloy Composition (at. %) | Upsetting Temp. (° C.) | Sat. Magn. (kG) | Res. Magn. (kG) | Int. Coercive Force (kOe) | Max. Energy Product (MGOe) |
|---|---|---|---|---|---|---|
| 42 | $Nd_2Fe_{96.5}Cu_{0.5}B_1$ | 850 | 20.9 | 19.5 | 7.1 | 36.9 |
| 43 | $Nd_2Fe_{94}Cu_3B_1$ | 850 | 19.0 | 18.1 | 9.0 | 50.4 |
| 7 | $Nd_2Fe_{87}Cu_{10}B_1$ | 850 | 17.1 | 16.2 | 16.9 | 42.2 |
| 8 | $Nd_2Fe_{92}Cu_3B_3$ | 850 | 18.6 | 17.8 | 13.7 | 69.3 |
| 9 | $Nd_2Fe_{90}Cu_3B_5$ | 850 | 17.7 | 17.2 | 18.0 | 68.6 |
| 10 | $Nd_5Fe_{91}Cu_3B_1$ | 850 | 17.3 | 16.8 | 19.9 | 65.2 |
| 11 | $Nd_5Fe_{89}Cu_3B_3$ | 850 | 17.0 | 16.5 | 20.7 | 61.9 |
| 12 | $Nd_5Fe_{87}Cu_3B_5$ | 850 | 16.8 | 16.2 | 21.9 | 60.2 |
| 13 | $Nd_7Fe_{89}Cu_3B_1$ | 850 | 16.7 | 16.2 | 20.5 | 59.9 |
| 14 | $Nd_7Fe_{87}Cu_3B_3$ | 850 | 16.4 | 16.1 | 21.8 | 58.8 |
| 15 | $Nd_7Fe_{85}Cu_3B_5$ | 850 | 16.0 | 15.5 | 23.3 | 55.0 |
| 16 | $Nd_{10}Fe_{86}Cu_3B_1$ | 850 | 15.7 | 15.4 | 21.5 | 53.4 |
| 17 | $Nd_{10}Fe_{84}Cu_3B_3$ | 850 | 15.3 | 14.9 | 23.9 | 51.1 |
| 18 | $Nd_{10}Fe_{82}Cu_3B_5$ | 850 | 15.0 | 14.7 | 24.8 | 48.7 |
| 19 | $Nd_7Fe_{87}Cu_3B_3$ | 700 | 15.9 | 15.2 | 22.3 | 51.7 |
| 20 | $Nd_7Fe_{87}Cu_3B_3$ | 950 | 16.9 | 16.3 | 20.5 | 60.5 |
| 21 | $Nd_7Fe_{87}Cu_3B_3$ | 1100 | 17.3 | 15.9 | 18.4 | 51.7 |
| 22 | $Nd_7Fe_{69}Co_{17}Cu_3B_3$ | 850 | 16.9 | 16.1 | 19.6 | 59.6 |
| 23 | $Nd_7Fe_{60}Co_{27}Cu_3B_3$ | 850 | 16.5 | 15.9 | 19.2 | 58.4 |
| 24 | $Nd_{3.5}Pr_{3.5}Fe_{87}Cu_3B_3$ | 850 | 16.8 | 16.3 | 19.9 | 60.4 |
| 25 | $Nd_6Ce_1Fe_{87}Cu_3B_3$ | 850 | 17.5 | 17.0 | 19.8 | 67.6 |
| 26 | $Nd_5Dy_2Fe_{87}Cu_3B_3$ | 850 | 16.4 | 15.9 | 35.0 | 54.0 |
| 27 | $Nd_6Tb_1Fe_{87}Cu_3B_3$ | 850 | 16.7 | 16.2 | 30.6 | 59.9 |
| 28 | $Nd_5Dy_1Ce_1Fe_{87}Cu_3B_3$ | 850 | 17.3 | 16.8 | 28.6 | 65.2 |
| 29 | $Nd_7Fe_{87}Cu_{2.7}Si_{0.3}B_3$ | 850 | 16.5 | 16.2 | 21.5 | 59.1 |
| 30 | $Nd_7Fe_{87}Cu_2Si_1B_3$ | 850 | 16.9 | 16.7 | 22.0 | 64.5 |
| 31 | $Nd_7Fe_{87}Cu_{1.5}Si_{1.5}B_3$ | 850 | 16.5 | 16.3 | 21.9 | 59.8 |
| 32 | $Nd_7Fe_{87}Cu_2Mg_1B_3$ | 850 | 16.6 | 16.2 | 22.6 | 59.4 |
| 33 | $Nd_7Fe_{87}Cu_2Al_1B_3$ | 850 | 16.7 | 16.4 | 23.6 | 60.4 |
| 34 | $Nd_7Fe_{87}Cu_2P_1B_3$ | 850 | 16.5 | 16.1 | 21.9 | 58.9 |
| 35 | $Nd_7Fe_{87}Cu_2Zn_1B_3$ | 850 | 16.7 | 16.3 | 24.3 | 60.5 |
| 36 | $Nd_7Fe_{87}Cu_2Ge_1B_3$ | 850 | 16.5 | 16.2 | 18.9 | 59.9 |
| 37 | $Nd_7Fe_{87}Cu_2Sb_1B_3$ | 850 | 16.8 | 16.2 | 18.2 | 58.9 |
| 38 | $Nd_7Fe_{87}Cu_2Sn_1B_3$ | 850 | 16.6 | 16.3 | 19.8 | 59.5 |
| 39 | $Nd_7Fe_{87}Cu_2Ni_1B_3$ | 850 | 16.5 | 16.2 | 19.9 | 59.0 |
| Comp. Ex. 3 | $Nd_7Fe_{87}Cu_3B_3$ | 600 | 14.9 | 9.2 | 25.2 | 16.2 |

As is shown in Table 5, the magnets of Examples 5 to 39 have a maximum energy product of from about 37 to 69 MGOe, which is about three or more times those of ordinary isotropic bonded magnets (about 7 to 12 MGOe). In particular, the maximum energy product of the magnets of Examples 8 to 12 and 20 exceeds 60 MGOe, which is higher than those of conventional anisotropic magnets, proving the effects of the preferred Nd—Fe—Cu—B alloy compositions having a Nd content (x) of 2 to 7 atomic percent, a B content (y) of 1 to 5 atomic percent, and a Cu content (z) of 3 atomic percent. All the magnets of Examples 5 to 39 have a saturation magnetization of more than 15.5 kG and an intrinsic coercive force of more than 7 kOe.

Reviewing Examples 14 and 19 to 21 having the same composition but adopting different upsetting temperatures, Examples 14 and 20, wherein the upsetting temperature is 850° C. or 950° C., achieve a higher maximum energy product than Examples 19 and 21, supporting the preference for the plastic forming temperature range of from 850 to 950° C. In Comparative Example 3 wherein the same composition as in Examples 14 and 19 to 21 is used but the upsetting temperature is 600° C., the maximum energy product is as low as about 16 MGOe, and the saturation magnetization and the residual magnetization are also low.

In Examples 22 and 23 having a relatively high Co content, the maximum energy product is about 60 MGOe, and the intrinsic coercive force is as high as about 19 to 20 kOe.

Examples 24 to 28 containing at least one rare earth element (e.g., Pr) in addition to Nd also have a high maximum energy product (about 54 to 68 MGOe) and a further increased intrinsic coercive force (about 20 to 35 kOe). Examples 29 to 39 containing one of Mg, Al, Si, P, Zn, Ge, Sb, Sn, and Ni have a further increased maximum energy product (about 59 to 65 MGOe) and a high intrinsic coercive force (about 18 to 24 kOe).

It is easily understood that the actions and effects of the anisotropic magnet and the process of producing the anisotropic magnet according to the present invention are supported by Examples 1 to 39.

FIG. 3 shows a rotor 52 of a motor, which has plate-shaped anisotropic magnets 58. The magnets 58 are produced by cold pressing and hot pressing ribbons 8 prepared by rapid solidification of a molten alloy having the same composition as used in Example 1 and upsetting the formed body at 1000° C. into a plate. Having the axis of easy magnetization in the thickness direction, the magnet 58 is magnetized to have an N-pole on one side thereof and an S-pole on the other as shown in FIG. 3.

The rotor 52 comprises a disk 54 having a through-hole 56 at the center, through which a rotating shaft is inserted, and four magnets 58 fixed thereto in the radial direction with one end of each magnet 58 centered at the hole 56 making right angles with one another.

The rotor 52 is assembled with a stator (not shown) having an electromagnet (not shown) into a motor. The motor produces a maximum torque increased by about 20 to 30% over a motor having the same number of conventional magnets of the same size. Application of the motor having the rotor 52 to an electric car or a hybrid electric car will provide excellent electrical characteristics or an improved fuel efficiency.

It would be easily recognized that a motor comprising a stator having a plurality of anisotropic magnets 58 shaped into a curved rectangular plate disposed on the inner surface thereof and a rotor having an electromagnet disposed in the center thereof exhibits the same performance as described above.

It should be understood that the present invention is not limited to the above-described embodiments and Examples, and various modifications can be made therein. For example, while the foregoing Examples shows only one combination of rare earth elements that can be added to the Nd—Fe—Cu—B alloy system (Example 28), other combinations of Pr, Ce, Dy, and Tb can be used as well. The metal elements Si, Mg, Al, P, Zn, Ge, Sb, Sn, and Ni can be added to the Nd—Fe—Cu—B alloy system not only individually as in Examples 29 to 39 but as a combination of two or more thereof. Any alloy compositions other than those specified in the foregoing Examples produce the same effects as demonstrated above provided that they are within the scope of the present invention.

The anisotropic magnet according to the present invention is applicable as a permanent magnet for linear motors, adsorbent magnet for artificial teeth, a permanent magnet for nuclear magnetic resonance apparatus, and the like as well as a permanent magnet for electric car motors.

While the invention has been described in detail and with reference to specific embodiments thereof, it will be apparent to one skilled in the art that various changes and modifications can be made therein without departing from the spirit and scope thereof.

This application is based on Japanese patent applications No. 2000-243637 filed on Aug. 11, 2000 and No. 2000-243642 filed on Aug. 11, 2000, the entire contents of each thereof being hereby incorporated by reference.

What is claimed is:

1. An anisotropic magnet which comprises a $Nd_2Fe_{14}B$ phase and an $\alpha$-Fe phase wherein the compositional formula of Nd, Fe and B satisfies $Nd_xFe_{100-x-y}B_y$ and x is 2 to 10 atomic percent and y is 1 to 5 atomic percent and wherein said magnet has a maximum energy product, $BH_{max}$, of 19.8 MGOe or greater.

2. An anisotropic magnet as claimed in claim 1, wherein x is 5 to 7 atomic percent and y is 1 to 5 atomic percent.

3. An anisotropic magnet as claimed in claim 1, which has 30 atomic percent or less of Fe displaced with Co.

4. An anisotropic magnet as claimed in claim 1, which has 1 atomic percent or less of Fe displaced with at least one element selected from Nb, V, Ti, Cr, Mo, Ta, W, Zr, and Hf.

5. An anisotropic magnet as claimed in claim 1, which has 50 atomic percent or less of Nd displaced with at least one rare earth element selected from Pr, Ce, Dy, and Tb.

6. An anisotropic magnet as claimed in claim 1, which is a molded mixture of powder comprising the $Nd_2Fe_{14}B$ phase and the $\alpha$-Fe phase and a binder resin.

7. An anisotropic magnet as claimed in claim 1, wherein the anisotropic magnet has a saturation magnetization of 15.5 kG or higher and an intrinsic coercive force of 4 to 30 kOe.

8. The anisotropic magnet as claimed in claim 1, which further comprises a Nd—Cu phase and the compositional formula of Nd, Fe, B and Cu satisfies $Nd_xFe_{100-x-y-z}B_yCu_z$ wherein x is 2 to 10 atomic percent, y is 1 to 5 atomic percent, and z is 0.5 to 10 atomic percent.

9. An anisotropic magnet as claimed in claim 8, wherein x is 2 to 7 atomic percent, y is 1 to 5 atomic percent, and z is 0.5 to 10 atomic percent.

10. An anisotropic magnet as claimed in claim 8, which has 30 atomic percent or less of Fe displaced with Co.

11. An anisotropic magnet as claimed in claim 8, which has 50 atomic percent or less of Cu displaced with at least one element selected from Mg, Al, Si, P, Zn, Ge, Sb, Sn, and Ni.

12. An anisotropic magnet as claimed in claim 8, which has 50 atomic percent or less of Nd displaced with at least one rare earth element selected from Pr, Ce, Dy, and Tb.

13. An anisotropic magnet as claimed in claim 8, which is a molded mixture of powder comprising the $Nd_2Fe_{14}B$ phase, the $\alpha$-Fe phase, and the Nd—Cu phase and a binder resin.

14. An anisotropic magnet as claimed in claim 8, which or magnetic powder of which has a saturation magnetization of 15.5 kG or higher and an intrinsic coercive force of 7 to 35 kOe.

15. A process of producing an anisotropic magnet according to claim 1, which comprises a step of plastic forming a powder or a bulk of powder which comprises a $Nd_2Fe_{14}B$ phase and an $\alpha$-Fe phase and the compositional formula of Nd, Fe and B satisfies $Nd_xFe_{100-x-y}B_y$ wherein x is 2 to 10 atomic percent and y is 1 to 5 atomic percent, at a temperature ranging from 900° to 1100° C.

16. A process of producing an anisotropic magnet according to claim 1 including the step of plastic forming powder or a bulk of powder which comprises a $Nd_2Fe_{14}B$ phase, an $\alpha$-Fe phase, and a Nd—Cu phase and the compositional formula of Nd, Fe, B and Cu satisfies $Nd_xFe_{100-x-y-z}B_yCu_z$ wherein x is 2 to 10 atomic percent, y is 1 to 5 atomic percent, and z is 0.5 to 10 atomic percent, at a temperature ranging from 700° to 1100° C.

17. A process of producing an anisotropic magnet as claimed in claim 15, wherein said plastic forming is upsetting or extrusion.

18. A process of producing an anisotropic magnet as claimed in claim 11, wherein said plastic forming is preceded by cold pressing and hot pressing.

19. A process of producing an anisotropic magnet as claimed in claim 15, wherein said plastic forming is followed by the step of grinding the resulting anisotropic magnet to powder, mixing the powder with a binder resin, and molding the mixture by injection molding or compression molding in a magnetic field.

20. A motor which comprises the anisotropic magnet as claimed in claim 1 fitted to a rotor or a stator as a permanent magnet.

21. A process of producing an anisotropic magnet as claimed in claim 16, wherein said plastic forming is upsetting or extrusion.

22. A process of producing an anisotropic magnet as claimed in claim 16, wherein said plastic forming is preceded by cold pressing and hot pressing.

23. A process of producing an anisotropic magnet as claimed in claim 16, wherein said plastic forming is followed by the step of grinding the resulting anisotropic magnet to powder, mixing the powder with a binder resin, and molding the mixture by injection molding or compression molding in a magnetic field.

24. A motor which comprises the anisotropic magnet as claimed in claim 8 fitted to a rotor or a stator as a permanent magnet.

25. An anisotropic magnet according to claim 1, wherein the anisotropic magnet has a maximum energy product, $BH_{max}$, of 70 MGOe or less.

26. An anisotropic magnet according to claim 1, wherein the anisotropic magnet has a maximum energy product, $BH_{max}$, of from about 30 MGOe to about 70 MGOe.

* * * * *